(12) United States Patent
Eichholz et al.

(10) Patent No.: US 6,702,362 B2
(45) Date of Patent: Mar. 9, 2004

(54) CONVERTIBLE VEHICLE HAVING AT LEAST TWO RIGID ROOF PARTS

(75) Inventors: Stefan Eichholz, Bohmte (DE); Thorsten Budzinski, Lengerich (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/249,599

(22) Filed: Apr. 23, 2003

(65) Prior Publication Data

US 2003/0197396 A1 Oct. 23, 2003

(30) Foreign Application Priority Data

Apr. 23, 2002 (DE) .......................... 102 17 917

(51) Int. Cl.[7] .................................. B60J 7/00
(52) U.S. Cl. ............. 296/108; 296/107.08; 296/107.07
(58) Field of Search ................. 296/108, 107.08, 296/136, 146.14, 107.07, 116, 214, 223

(56) References Cited

U.S. PATENT DOCUMENTS

| | | | | |
|---|---|---|---|---|
| 5,542,735 A | * | 8/1996 | Furst et al. | 296/107.08 |
| 5,558,388 A | * | 9/1996 | Furst et al. | 296/108 |
| 5,746,470 A | * | 5/1998 | Seel et al. | 296/108 |
| 5,769,483 A | * | 6/1998 | Danzl et al. | 296/108 |
| 5,823,606 A | * | 10/1998 | Schenk et al. | 296/107.08 |
| 6,010,178 A | * | 1/2000 | Hahn et al. | 296/107.08 |
| 6,039,383 A | * | 3/2000 | Jambor et al. | 296/108 |
| 6,131,988 A | * | 10/2000 | Queveau et al. | 296/108 |
| 6,336,673 B1 | * | 1/2002 | Rothe et al. | 296/108 |
| 6,382,703 B1 | * | 5/2002 | Queveau et al. | 296/108 |
| 6,419,296 B2 | * | 7/2002 | Dintner et al. | 296/108 |
| 6,425,621 B2 | * | 7/2002 | Miklosi et al. | 296/108 |
| 6,481,781 B2 | * | 11/2002 | Bergerhoff et al. | 296/108 |
| 6,497,446 B2 | * | 12/2002 | Obendiek | 296/107.08 |
| 6,502,892 B2 | * | 1/2003 | Eberle | 296/108 |
| 6,572,175 B2 | * | 6/2003 | Schutt et al. | 296/108 |
| 2002/0158485 A1 | * | 10/2002 | Klaus | 296/107.07 |
| 2002/0175536 A1 | * | 11/2002 | Biecker et al. | 296/107.07 |
| 2003/0034667 A1 | * | 2/2003 | Willard | 296/108 |

FOREIGN PATENT DOCUMENTS

| | | | |
|---|---|---|---|
| DE | 36 35 373 | * | 4/1988 |
| DE | 37 33 892 | * | 4/1989 |
| DE | 43 16 485 | * | 11/1994 |
| DE | 196 42 152 | | 4/1998 |
| JP | 62 120223 | * | 6/1987 |

* cited by examiner

Primary Examiner—Kiran Patel
(74) Attorney, Agent, or Firm—Gudrun E. Huckett

(57) ABSTRACT

A convertible vehicle has a carbody having a rear area and a roof connected to the carbody. The roof has a first rigid roof part arranged rearwardly and provided with a rear window. The roof further has at least one second rigid roof part. The first and second roof parts can be nested into one another when opening the roof and stowed in the stowed position in the rear area of the carbody. The first roof part is positioned in a stowed position of the roof above the at least one second roof part in a substantially horizontal position. The rear window has an exterior side in a closed position of the roof, and the exterior side of the rear window in the stowed position faces upwardly.

9 Claims, 9 Drawing Sheets

CONVERTIBLE VEHICLE HAVING AT LEAST TWO RIGID ROOF PARTS

BACKGROUND OF INVENTION

1. Field of the Invention

The invention relates to a convertible vehicle having at least two rigid roof parts which can be nested and stowed in the rear vehicle area for opening the roof (putting down the top).

2. Description of the Related Art

DE 1 96 42 152 A1 describes a motor vehicle with three rigid roof parts which can be arranged in a space-saving way within a roof compartment. For this purpose, during a first movement phase the entire roof comprising sequentially aligned roof parts is pivoted downwardly so that the rear roof end member projects far into the carbody and there is the risk of it colliding with carbody parts. In order to prevent this, the rear window can be pivoted separately for which purpose separate drive members are provided. Accordingly, in a first step the rear window can be placed into the roof compartment before the roof in its entirety is pivoted downwardly. When the rear window extends to the rear roof end member, only the areas of the rear roof part positioned laterally adjacent to the window pane project far downwardly upon pivoting and can be received, for example, in pockets arranged adjacent to the wheel wells so that the risk of collision with carbody parts is reduced. However, this requires an additional expenditure. Moreover, the pivoting action of the entire roof during the pivoting process causes temporarily a significant increase of the vehicle height which, in particular, in a garage, can result in the roof hitting the ceiling of the garage. Also, the separately placed rear window takes up additional space in the vehicle.

SUMMARY OF INVENTION

It is an object of the present invention to optimize a convertible vehicle of the aforementioned kind with respect to the roof geometry and the stowing geometry.

In accordance with the present invention, this is achieved in that the rear roof part comprising the rear window is located in the stowed position of the roof above the at least one additional roof part in a substantially horizontal position, wherein the surface of the rear window facing the exterior in the closed state of the roof faces upwardly.

With this configuration according to the invention, a separate drive for the rear window is eliminated. The rear window can be fixedly embedded within the rear roof part so that additional component groups are no longer needed and the control of the stowing action and of the closing action of the roof is simplified. The space required for the folded or stowed roof is minimized.

When, as is particularly advantageous, in a first movement phase for opening the roof during pivoting of the roof into the open position the roof parts are simultaneously nested in one another, the size or height of the vehicle remains minimal even during the opening action of the roof. No position results in which the entire roof would be pivoted upwardly with its leading end. Accordingly, opening of the roof and closing of the roof can be performed generally while the vehicle is located in a garage.

It is particularly advantageous, when, in the case of the roof being in the stowed position while a passageway for luggage is to be opened, the stowed roof can be moved upwardly; in this way, large pieces of luggage can also be placed into the trunk and can be stored underneath the stowed roof even after the stowed roof is returned into the initial stowed position. As a result of the slight lifting of the stowed roof, the passageway to the trunk space is however enlarged. In particular, a very large access opening results when the leading end of the stowed or folded roof can be moved upwardly and, at the same time, forwardly in the travel direction. It is then possible, for example, to store hard shell suitcases or similarly bulky luggage pieces whose vertical extension substantially completely fills the space underneath the stowed roof.

DETAILED DESCRIPTION

The convertible vehicle 1 illustrated in the drawings comprises a carbody 2 providing a passenger compartment (interior) 3 for front and rear passengers. This interior 3 is covered by a roof 4. The roof 4 is of a three-part configuration and comprises a rear roof part 5 having a rear window 6 embedded therein and further comprises a central roof part 7, positioned forwardly relative to the rear roof part 5, and a front roof part 8. The three-part roof configuration is not mandatory. In particular, for example, in the case of a passenger compartment which comprises only a single row of seats, a two-part roof configuration is sufficient.

All of the roof parts 5, 7, 8 can be rigid and made, for example, of plastic material, metal, a foamed metal material or the like. It is also possible that all roof parts 5, 7, 8 are configured as rigid frame parts and are covered by a textile covering, respectively.

Figure 8:
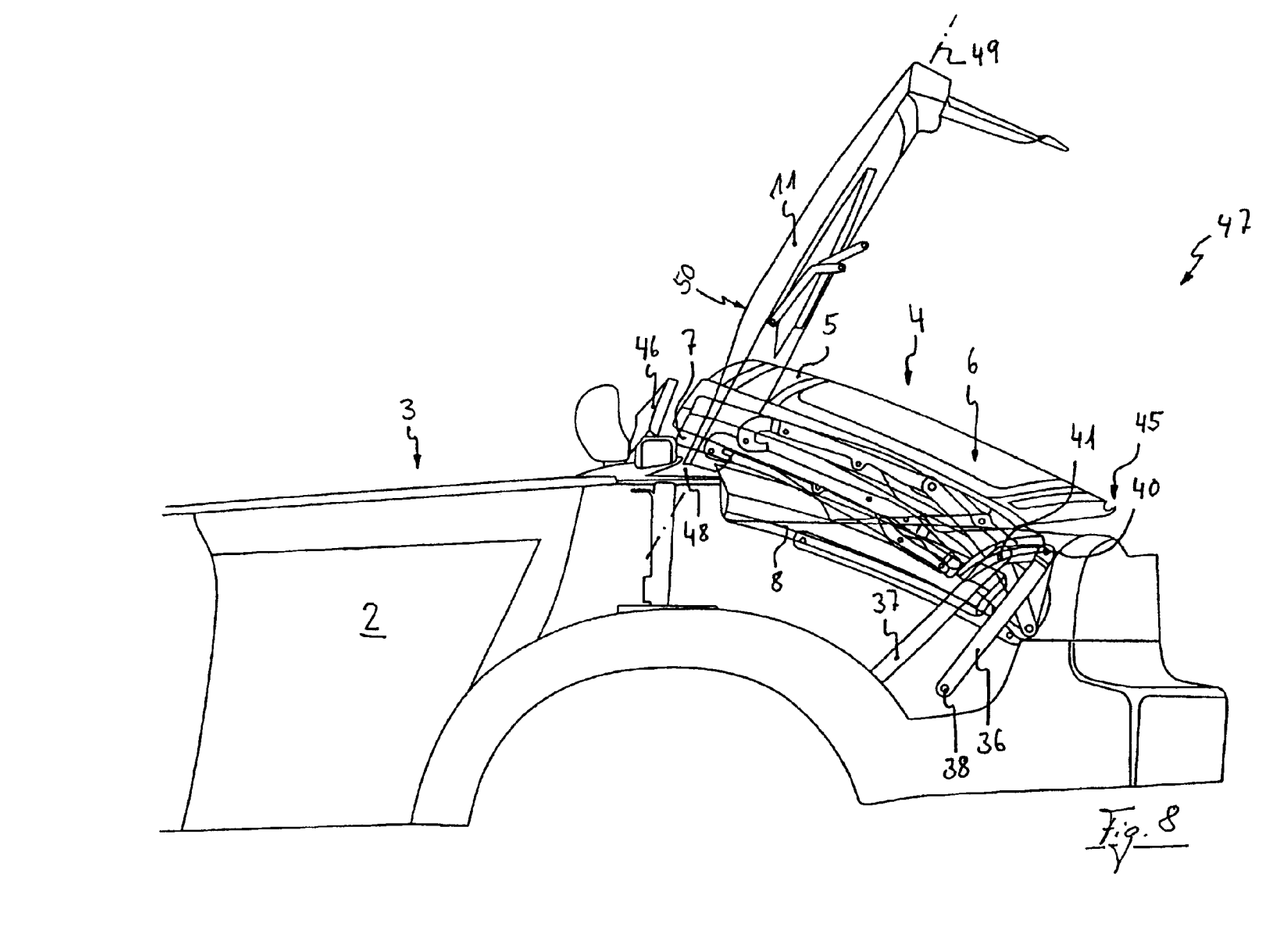
FIG. 8 is a view of the convertible vehicle with the roof in the stowed position, wherein the lid is in an open position for opening a passageway for luggage, wherein the stowed roof has been moved slightly forwardly and upwardly.
Figure 9:
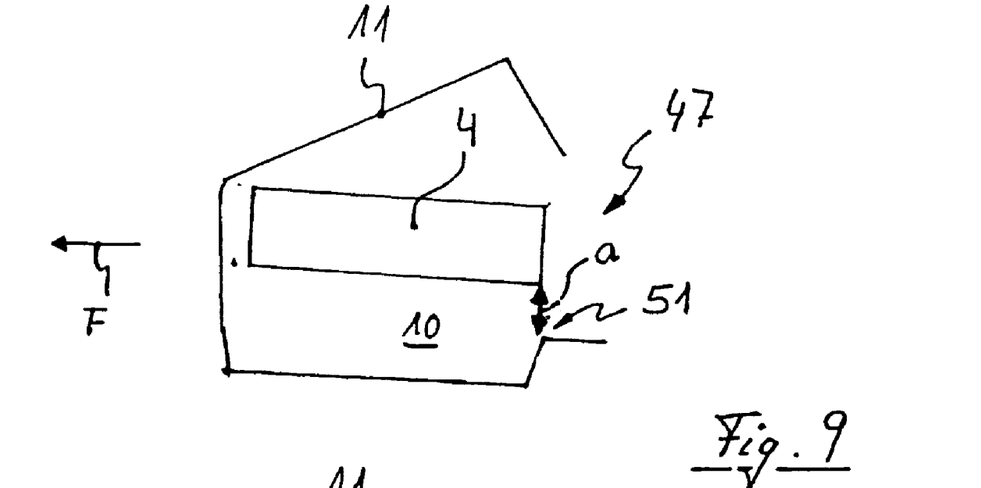
FIG. 9 is a schematic view of the stowed roof package with open lid for opening the passageway for luggage without the package of the roof parts having been moved.
Figure 10:
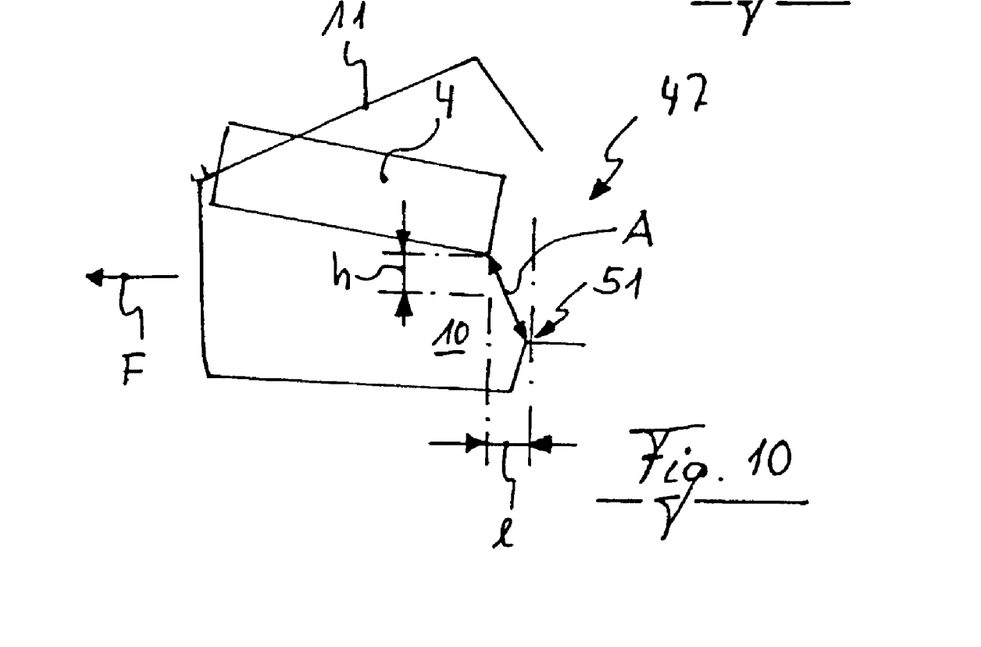
FIG. 10 shows in a view similar to the view of FIG. 9 the roof parts in the moved position.

The roof 4 in its entirety can be stowed in the rear area of the carbody 2 in a roof receiving compartment 9 which when the roof (top) 4 is closed can be used as part of the trunk 10. The roof receiving compartment 9 and the trunk 10 can be covered at the topside by a lid 11 which in a first opening direction can be pivoted into a first position for releasing a passageway for the roof 4 (FIG. 1) and in a second opening direction can be moved into a second position for releasing a passageway for luggage (FIGS. 8 through 10).

The lid 11 can comprise an extension 12 which, when the roof is open and the lid is closed, can be forwardly extended in order to close the passageway allowing the roof movement.

For opening the roof, first the lid 11 is moved from a horizontal position in the direction of the arrow 13 about a transverse axis 14 at the rear of the vehicle. In this embodiment, the lid 11 is divided at the axis 14 so that a vertical portion 11a of the lid 11 remains stationary when the aforementioned pivot movement is carried out while only the horizontal area of the lid 11 is pivoted. This division is however not mandatory. A one-part configuration of the lid 11 is possible.

Figure 2:
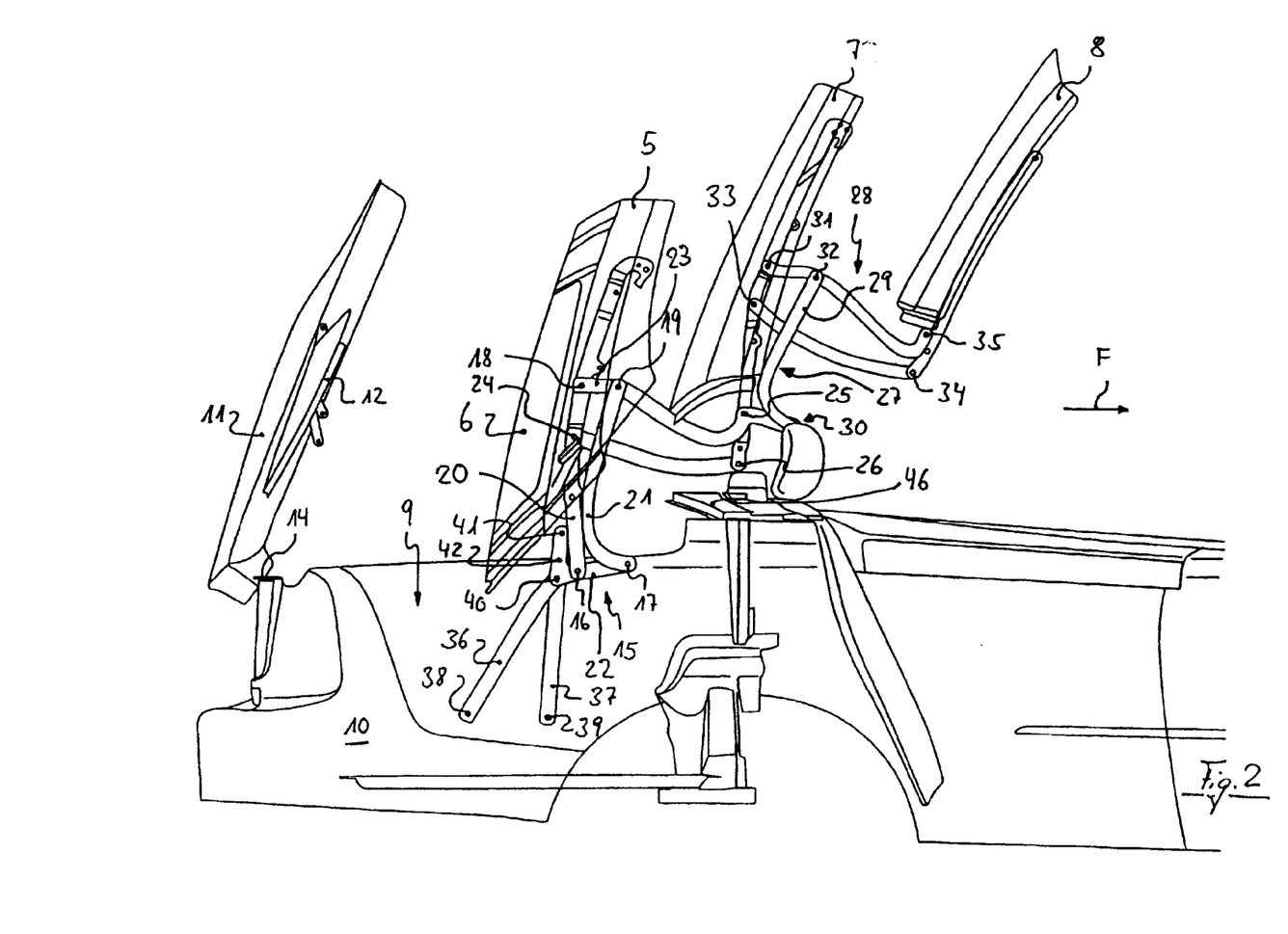
FIG. 2 shows a view similar to the view of FIG. 1 during the first movement phase of opening the roof in which the roof parts are pivoted upwardly and nested into one another at the same time.

In the first movement phase for opening the roof (FIGS. 2 and 3) the rear roof part 5 is pivoted into an open position about a main bearing 15 provided at the upper carbody area. This main bearing 15 forms for the rear roof part 5 a four-bar linkage which is formed by hinge points 16, 17, 18, 19 and guide bars 20, 21 as well as 22 and 23 connecting the hinge points, wherein the guide bars can be individual components or portions of guide bars which extend farther.

When pivoting the rear roof part 5 into the open position, pivoting of the forward roof parts 7 and 8 takes place at the same time. The parts 7, 8 are not themselves connected to the carbody 2 but are connected to one another and connected to the rear roof part 5.

The guide bar 21 serves as a drive rod for the movement of a second four-bar linkage formed by the hinge points 18, 24, 25, 26 by which the central roof part 7 is connected to the rear roof part 5. In this way, pivoting of the rear roof part 5 at the same time effects a parallel position of the central roof part 7 and its nesting in the curved inner space of the rear roof part 5.

At the same time, the front roof part 8 is pivoted in the same way relative to the central roof part 7 in a parallel position and is nested therein. For this purpose, additional four-bar linkages are provided, identified at 27 and 28, wherein a further drive rod 29 is provided for the last four-bar linkage 28. The four-bar linkage 27 is comprised of hinge points 25, 30, 31, 32; the four-bar linkage 28 is comprised of hinge points 31, 33, 34, and 35. The movement of the three roof parts 5, 7, 8 occurs thus completely synchronously and is controlled by the aforementioned guide bars.

At the end of the first movement phase (FIG. 3), the roof parts 5, 7, 8 are nested in one another. The rear roof part 5 spans across the roof parts 7, 8. The rear window 6 faces with its exterior side substantially to the rear. The entire package of roof parts 5, 7, 8 is slightly slanted to the rear relative to a vertical orientation. Overall, this package comprised of roof parts 5, 7, 8 is pivotable relative to the carbody 2 by two guide bars 36, 37 which are secured on hinges 38, 39. By means of the two rear hinge points 40, 41 of a boomerang-shaped lever 42 a four-bar linkage is formed with which the entire roof 4 can be moved relative to the carbody 2.

Figure 1:
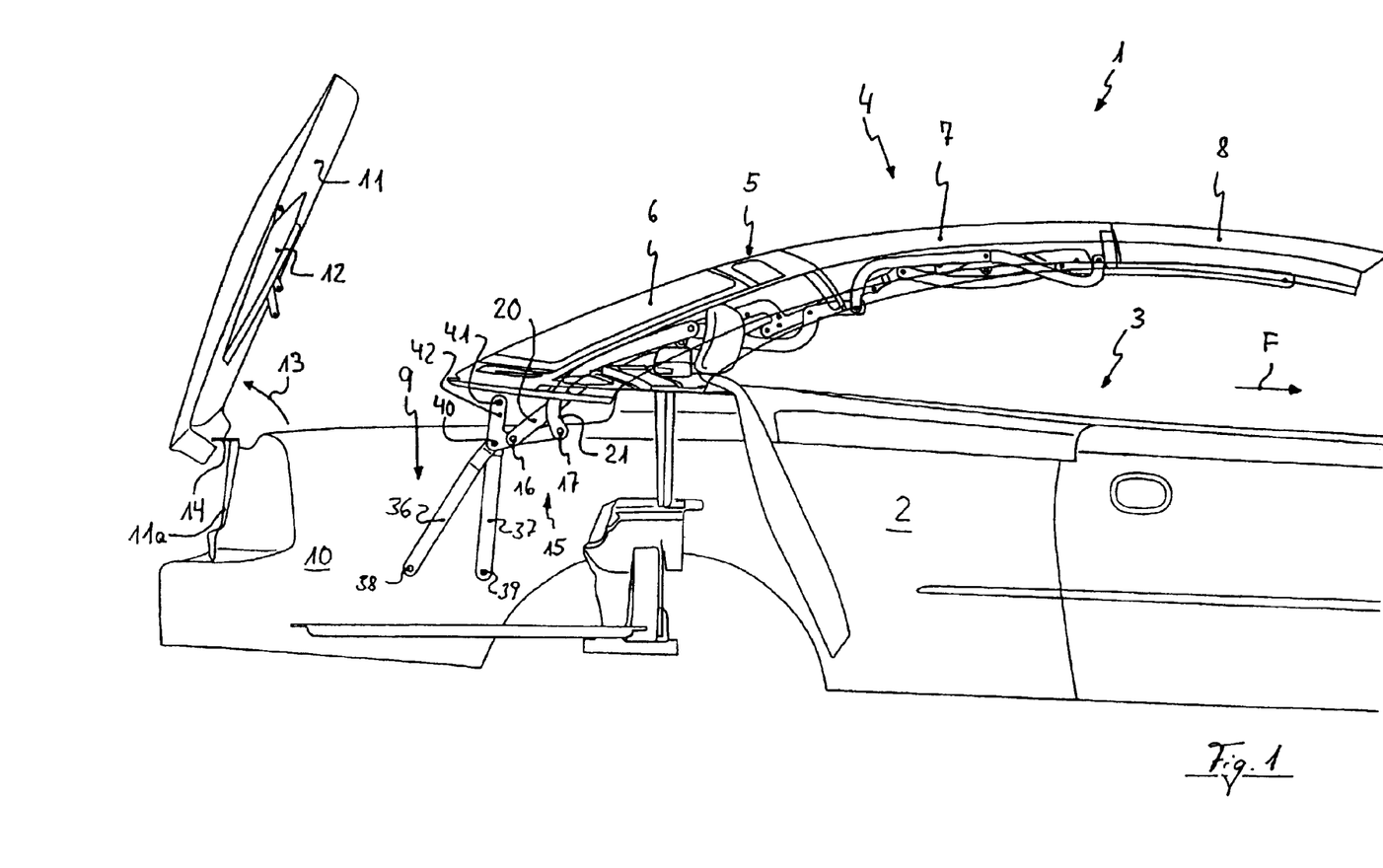
FIG. 1 shows in a broken-away, schematic side view a convertible vehicle with the roof in the closed position and already open lid covering the roof receiving compartment.
Figure 3:
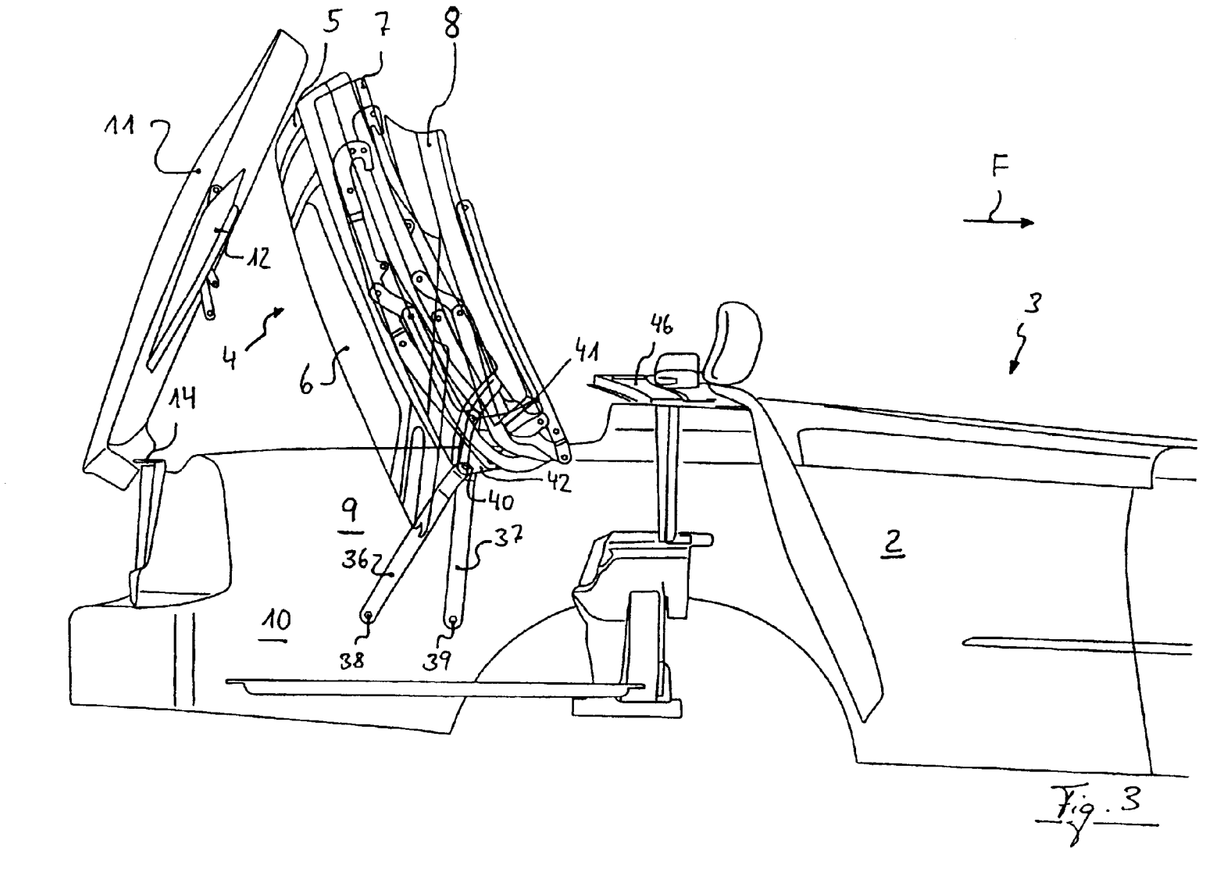
FIG. 3 shows a view similar to the view of FIG. 2 at the end of the first movement phase in which the roof parts have been pivoted into a position which is only slightly slanted relative to a vertical orientation and in which they are completely nested so that a package results which in its entirety is to be stowed.

In the first movement phase, i.e., the transition from FIG. 1 to FIG. 3, this four-bar linkage has not yet been moved. The hinges 16, 17 for the first four-bar linkage accordingly have not yet changed their position relative to the carbody 2.

Figure 4:
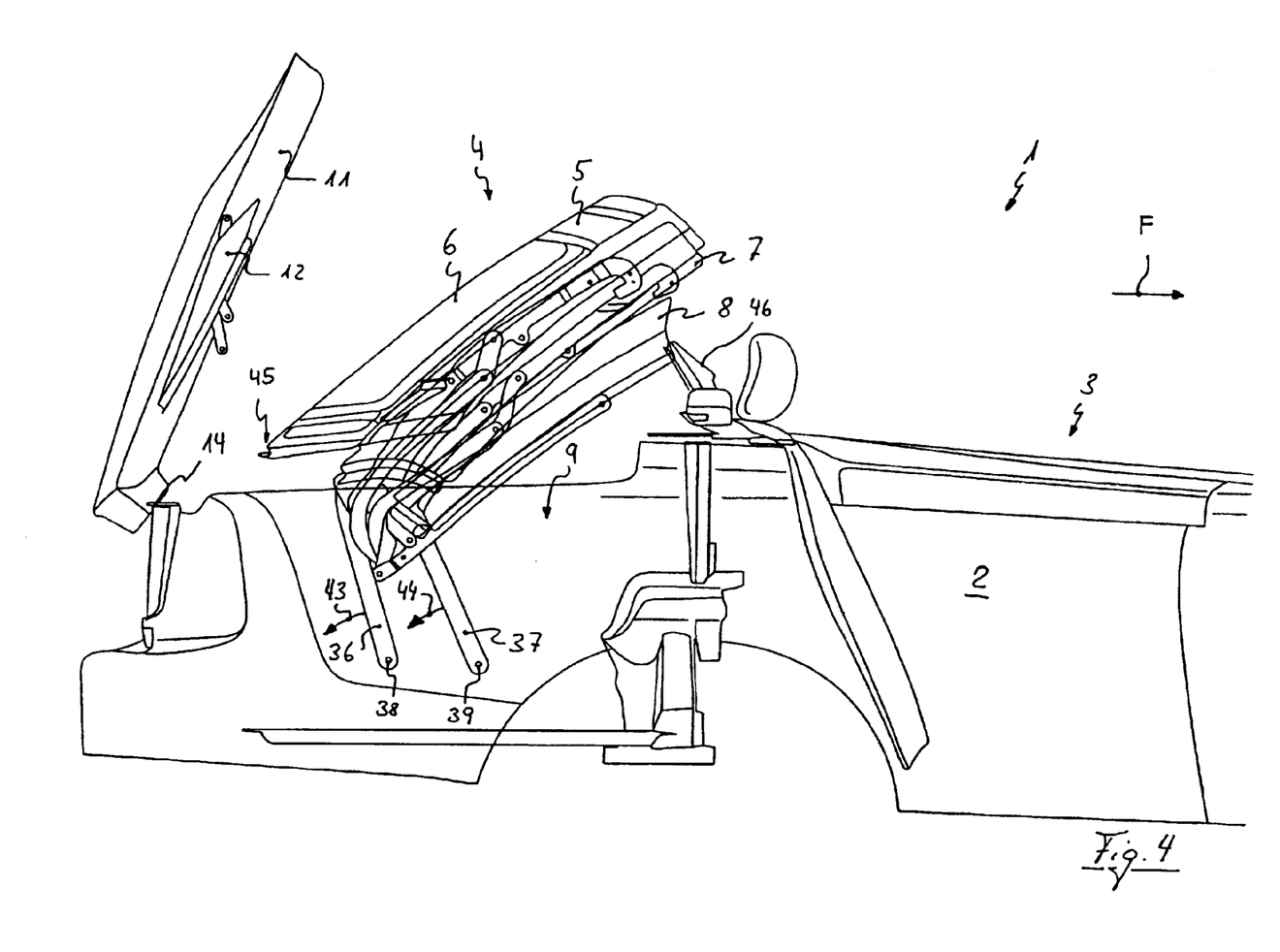
FIG. 4 shows a view similar to the view of FIG. 3 during the downward movement of the package of roof parts into the roof receiving compartment.

For the subsequent lowering of the roof 4 into its stowed position, the four-bar linkage 38, 39, 40, 41 is opened such that the levers 36, 37 are pivoted about the hinges 38, 39 in the direction of arrows 43, 44 to the rear and are pivoted downwardly (FIG. 4). Accordingly, the hinge point 40 of the boomerang lever 42 is moved into a position in which it points to the rear and upward, and the rear roof end member 45 is thus pulled upwardly and to the rear counter to the travel direction F.

Figure 5:
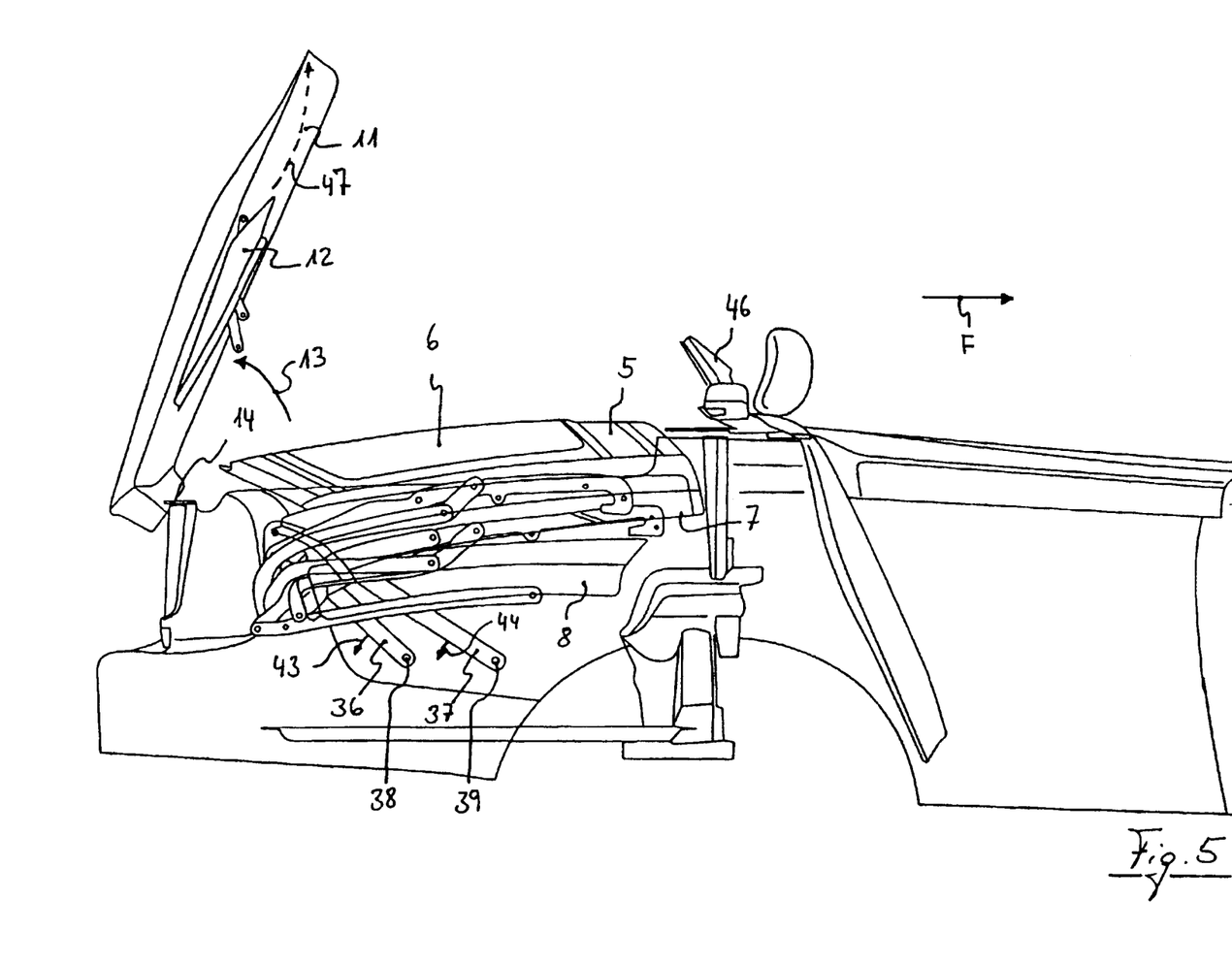
FIG. 5 shows a view similar to the view of FIG. 4 of the completely stowed roof with the lid still open so that the passageway for the roof is still open.
Figure 6:
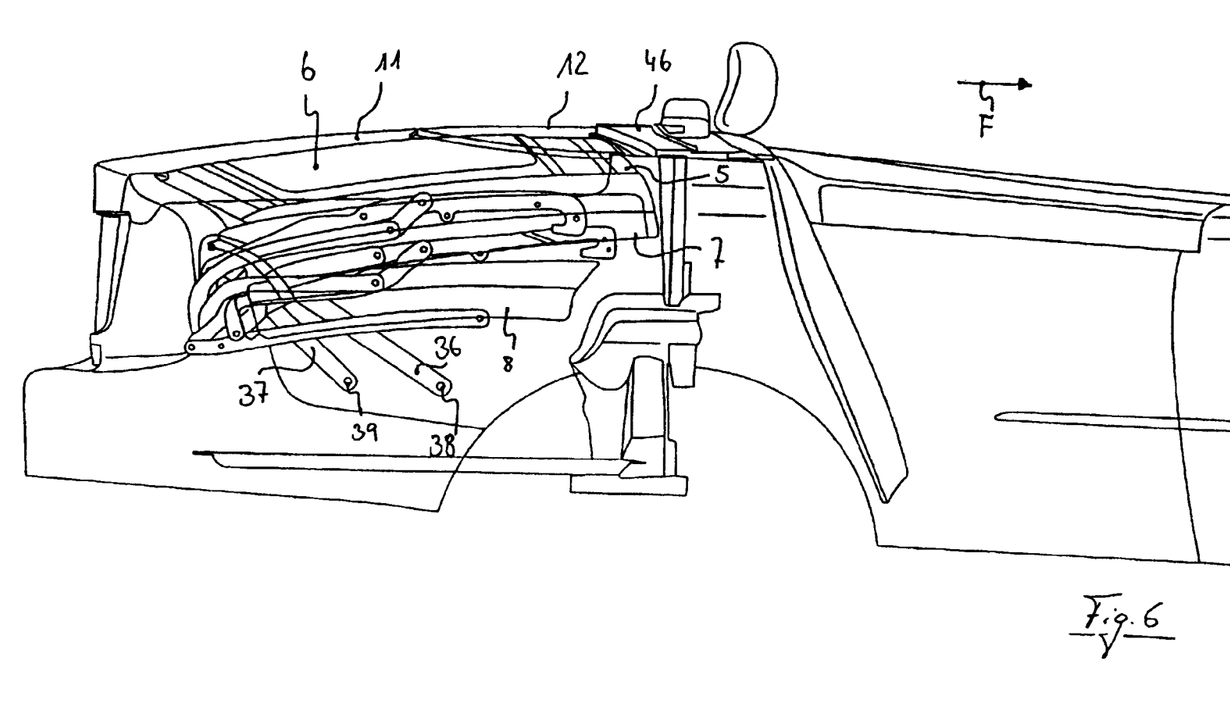
FIG. 6 shows a view similar to FIG. 5 of the completely stowed roof with the lid in the closed position.
Figure 7:
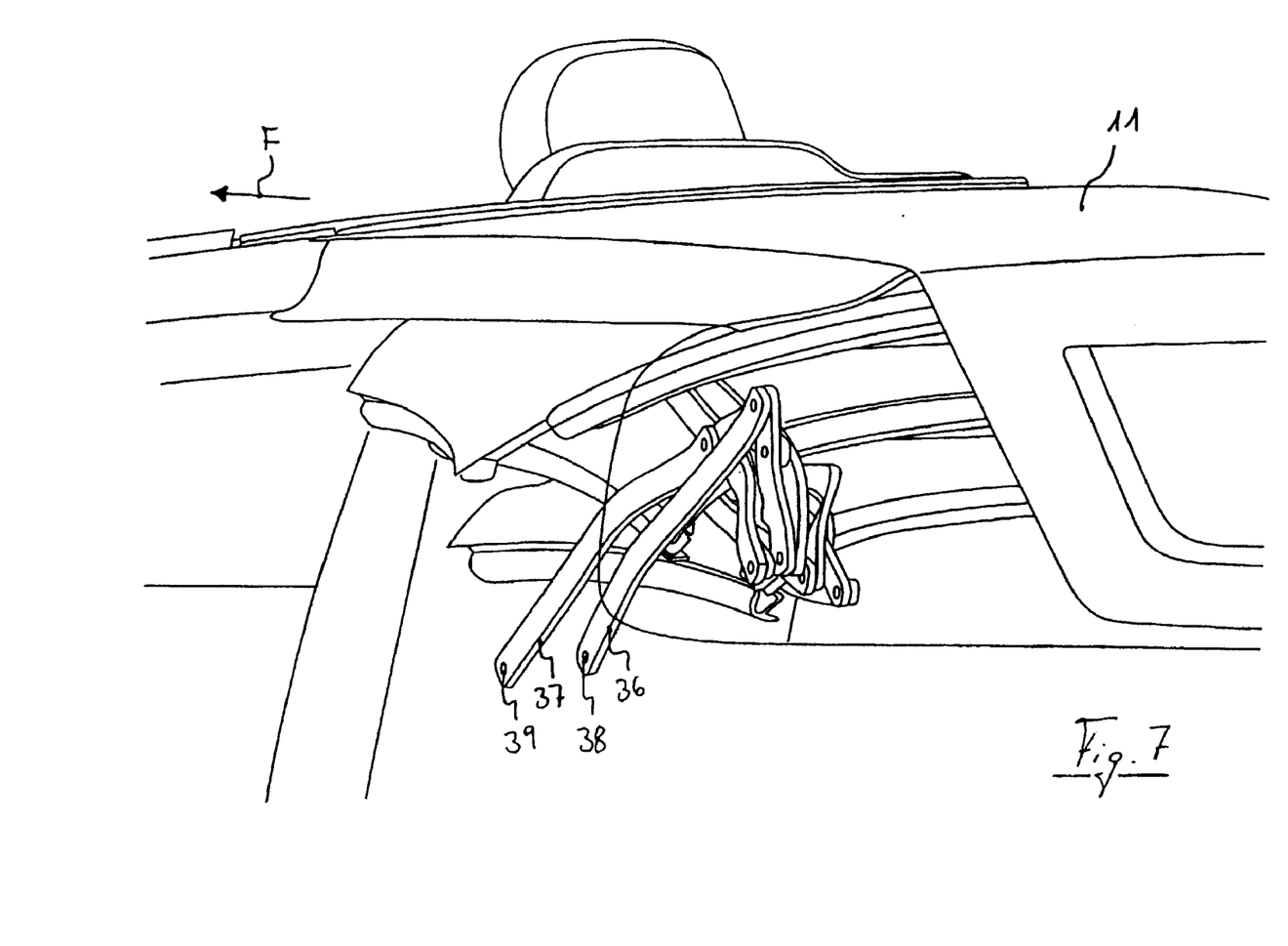
FIG. 7 shows in a schematic view at an angle from the rear the convertible vehicle with the roof in the stowed position according to FIG. 6.

In this way, the stowed roof 4 is in a substantially horizontal position with respect to the parts 5, 7, 8 wherein the exterior side of the rear window 6 points upwardly. In this folded position according to FIG. 5, the lid 11 can be closed counter to the direction of arrow 13. Moreover, a pivotable part 46 in the form of a rear deck, which during the opening movement was positioned substantially upright, can be pivoted into a horizontal position. The extension 12 of the lid 11 which can be moved telescopingly in the direction of arrow 47 can be pivoted downwardly during this movement and can be brought into a position flush with the lid 11 and the rear deck 46 so that the end position illustrated in FIG. 6 results when the roof 4 is open.

For releasing the passageway 47 for luggage, the lid 11 is pivoted in a second opening direction about axis 48 (FIG. 8). The extension 12 is retracted into a position underneath the lid 11 in order to provide in the forward area a passageway for the stowed roof parts 5, 7, 8 through the plane 49 of the lid. The forward end of the lid 11 in this case is indicated by the line 50.

As can be seen in FIGS. 9 and 10, this movement not only causes the package of the roof 4 to be lifted by the stroke h but also to be moved forwardly by the length l in the travel direction F. Relative to the not yet moved stowed package of the roof 4 (FIG. 9), the movement of the package of the roof 4 (FIG. 10) provides a significantly greater spacing A for loading luggage relative to a step 51 which delimits the trunk 10 to the rear in the area of the bumper and a rear transverse member. For example, even bulky pieces of luggage, such as hard shell suitcases, for which essentially enough space is available under the stowed roof 4 when the lid 11 is closed but which would not fit through the passageway defined by the spacing a of FIG. 9, can be loaded and removed without problems as a result of the enlargement of the spacing A for loading.

This enlargement of the spacing A of the loading area relative to the spacing a of the stowed roof in the initial stowed position (without having been moved) is a significant advantage of the invention and resides in that the package of the roof 4 in its entirety is secured in its rearward area by means of the guide bars 36 and 37 and the hinge points 38, 39, 40, 41 on a four-bar linkage. This has significant advantages, in particular, in comparison with a simple swivel mechanism of the roof 4.

While specific embodiments of the invention have been shown and described in detail to illustrate the inventive principles, it will be understood that the invention may be embodied otherwise without departing from such principles.

What is claimed is:

1. A convertible vehicle (1) comprising:
   a carbody (2) having a rear area;
   a roof (4) connected to the carbody (2);
   the roof (4) comprising a first rigid roof part (5) arranged rearwardly and comprising a rear window (6);
   the roof (4) further comprising at least one second rigid roof part (7, 8), wherein the first and second roof parts (5, 7, 8) are configured to be nested Into one another when opening the roof (4) and to be stowed in a stowed position in the rear area of the carbody (2);

wherein the first roof part (5) positioned in the stowed position of the roof (4) above the at least one second roof part (7, 8) in a substantially horizontal position;

wherein the rear window (6) has an exterior side in a closed position of the roof (4), wherein the exterior side of the rear window (6) in the stowed position of the roof (4) faces upwardly;

wherein the first and second roof parts (5, 7, 8) are connected to one another and wherein only the first roof part (5) is connected to the carbody (2);

wherein, for opening the roof (4), the first and second roof parts (5, 7, 8) are pivoted together and moved simultaneously into a nested intermediate position in a first movement phase.

2. The convertible vehicle according to claim 1, wherein in the nested intermediate position the first and second roof parts (5, 7, 8) are slanted slightly relative to a vertical transverse vehicle plane and are movable, while remaining nested, into the stowed position in which the first and second roof parts (5, 7, 8) are substantially horizontal.

3. The convertible vehicle according to claim 1, wherein at the end of the first movement phase the first and second roof parts (5, 7, 8) are nested such that curved portions of the first and second roof parts are nested with identical orientation, wherein the first roof part (5) has a convex curvature and surrounds an outer side of the at least one second roof part (7, 8).

4. The convertible vehicle according to claim 3, wherein the first and second roof parts (5, 7, 8) are moved, while remaining nested, from the nested intermediate position by a pivoting action and a longitudinal movement counter to a travel direction (F) into a substantially horizontal stowed position in which the first and second roof parts (5, 7, 8) are lowered into the carbody (2).

5. The convertible vehicle according to claim 4, comprising a four-bar linkage (38, 39, 40, 41) connecting the first and second roof parts (5, 7, 8) to the carbody (2), wherein the four-bar linkage enables the pivoting action and the longitudinal movement to the first and second roof parts (5, 7, 8) relative to the carbody (2).

6. The convertible vehicle according to claim 5, wherein the convertible vehicle (1) has two of the second roof parts (7, 8), wherein the first roof part (5) and the two second roof parts (7, 8) are positioned in a travel direction (F) of the convertible vehicle sequentially behind one another and are positioned atop one another in the stowed position of the roof (4).

7. The convertible vehicle according to claim 5, wherein the carbody (2) has a roof receiving compartment (9) and a lid (11) covering the roof receiving compartment (9), wherein the lid (11) is movable in a first opening direction for opening a first passageway for the roof (4) and movable in a second opening direction for opening a passageway (47) for luggage.

8. A convertible vehicle comprising:
a carbody (2) having a rear area;
a roof (4) connected to the carbody (2);
the roof (4) comprising a first rigid roof part (5) arranged rearwardly and comprising a rear window (6);
the roof (4) further comprising at least one second rigid roof part (7, 8), wherein the first and second roof parts (5, 7, 8) are configured to be nested into one another when opening the roof (4) and to be stowed in a stowed position in the rear area of the carbody (2);
wherein the first roof part (5) is positioned in the stowed position of the roof (4) above the at least one second roof part (7, 8) in a substantially horizontal position;
wherein the rear window (6) has an exterior side in a closed position of the roof (4), wherein the exterior side of the rear window (6) in stowed position of the roof 4 faces upwardly;
wherein the carbody (2) has a roof receiving compartment (9) and a lid (11) covering the roof receiving compartment (9), wherein the lid (11) is moveable in a second opening direction for opening a first passageway for the roof (4) and movable in a second opening direction far opening a passageway (47) for luggage;
wherein the roof (4) in the stowed position is moved upwardly when moving the lid (11) in the second opening direction.

9. A convertible vehicle comprising:
a carbody (2) having a rear area;
a roof (4) connected to the carbody (2);
the roof (4) comprising a first rigid roof part (5) arranged rearwardly and comprising a rear window (6);
the roof (4) further comprising at least one second rigid roof part (7, 8), wherein the first and second roof parts (5, 7, 8) are configured to be nested into one another when opening the roof 4 and to be stowed position in the rear area of the carbody (2);
wherein the first roof part (5) is positioned in the stowed position of the roof (4) above the at least one second roof nart (7, 8) In a substantially horizontal position;
wherein the rear window (6) has an exterior side in a closed position of the roof (4), wherein the exterior side of the rear window (6) in the stowed position of the roof (4) faces upwardly;
a four-bar linkage (38, 39, 40, 41) connecting the first and second roof parts (5, 7, 8) to the carbody (2), wherein the four-bar linkage enables the pivoting action and the longitudinal movement to the first and second roof parts (5, 7, 8) relative to the carbody (2);
wherein the carbody (2) has a roof receiving compartment (9) and a lid 11 covering the roof receiving compartment (9), wherein the lid (11) is movable in a first opening direction for opening a passageway (47) for luggage;
wherein, when moving the lid (11) in the second opening direction, a leading edge of the roof (4) in the stowed position relative to the travel direction (F) is moved by the four-bar linkage (38, 39, 40, 41) upwardly and at the same time forwardly in the travel direction (F).

* * * * *